(No Model.)
F. JARECKI.
LUBRICATOR.
No. 283,400. Patented Aug. 21, 1883.
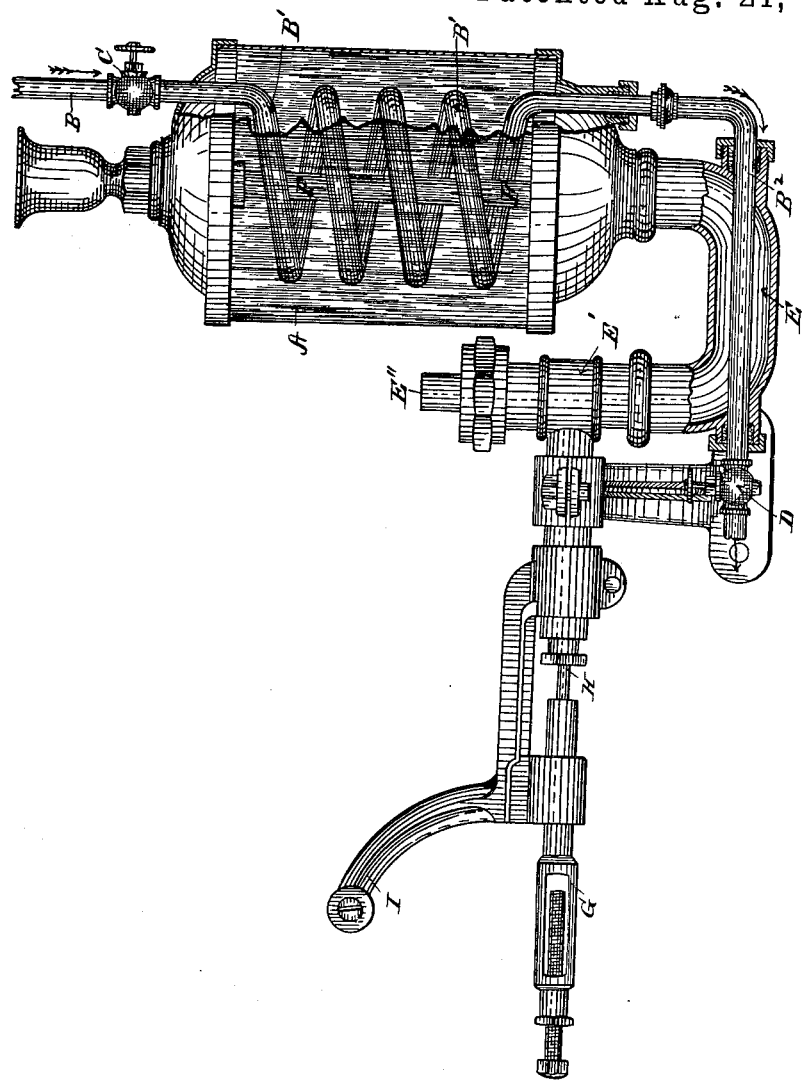
Witnesses
W. R. Edelen
M. A. Edelen
Inventor
F. Jarecki
Hullock & Hallock
Att'ys

United States Patent Office.

FRIDERICH JARECKI, OF ERIE, PENNSYLVANIA.

LUBRICATOR.

SPECIFICATION forming part of Letters Patent No. 283,400, dated August 21, 1883.

Application filed November 22, 1882. (No model.)

*To all whom it may concern:*

Be it known that I, FRIDERICH JARECKI, a citizen of the United States, residing at Erie, in the county of Erie and State of Pennsylvania, have invented certain new and useful Improvements in Lubricators for Steam-Engines; and I do hereby declare the following to be a full, clear, and exact description of the invention, such as will enable others skilled in the art to which it appertains to make and use the same.

This invention consists in providing certain new and useful improvements in lubricating apparatuses for steam-engines. The purpose of this invention is as follows: There are many lubricating devices in which the oil is drawn from the reservoir and forced through a conduit leading to the engine valve-chamber or the live-steam pipe by a pump which is operated by connections with some of the moving parts of the engine. This class of lubricators include such as is shown in a former patent to me, dated June 6, 1882; also, in an application for a patent by me now pending; also, in Patent No. 236,452, to C. H. Parshall, January 11, 1881. There are other forms of lubricators where pumps are used which are operated by hand. Many of these lubricators are illy adapted to use tallow or any lubricant which will easily congeal. In some instances they have been provided with reservoirs having double walls forming a steam-chamber around the oil-chamber like a jacket, by which means the lubricant in the reservoir is kept melted; but such a construction does not provide for keeping the lubricant in the conduit warm, and it also prevents the use of transparent reservoirs, which are very convenient, as they enable the attendant to observe the consumption of oil.

The object, therefore, of this invention is to provide means for keeping the lubricant in the reservoir and the conduit warm, and also permit the reservoir to be transparent. This I accomplish by means of a small steam-pipe which enters the reservoir and coils through it, and then passes into the conduit and follows it to any point desired, and then passes out. It may pass out of the conduit just before it reaches the pump or any valve which it may contain, or an observation-tube, such as is shown in Parshall's patent, and then re-enter the conduit and again follow it as far as desired. If desired, this small steam-pipe may be coiled around the conduit in place of running through it, and where the construction is such as to warrant it the small steam-pipe may be formed in the casting forming the conduit by coring out.

In the accompanying drawing the figure represents one of my lubricators in elevation, and shows the steam-pipe as applied by me in my construction, and therefrom it will be easy for any one skilled in the art to see how to apply the same to other constructions.

A is the oil or lubricant reservoir. E is the conduit leading to the pump. E' is the pump. E'' is the conduit leading from the pump to the part to be lubricated. B is the small steam-pipe; B', the coil of said pipe in the reservoir. B² is the same pipe in the conduit E. C and D are throttles for regulating the passage of steam in said pipe.

It will be observed that proper stuffing-boxes or other joints are provided where the steam-pipe enters or leaves the chambers filled with lubricant. The pipe is shown as broken off soon after leaving the conduit E; but it can easily be carried past the pump E' and made to enter the conduit E''.

As I have before remarked, the steam-pipe might be coiled around the conduits or it might be formed with the exterior pipe. In some instances the pump is close by the reservoir, while the part to be supplied is considerably removed, and in such cases the conduit E'' should be supplied with a pipe for heating it; but in other instances the pump is close to the part to be lubricated, but removed some distance from the reservoir, and in such cases the conduit E alone will require heating. It will be seen, however, that all contingencies can be provided for.

I am aware that oil-reservoirs having a conduit leading to the place to be lubricated have been heated by steam and the waste steam projected into the conduit, but am not aware that imperforate pipes have been passed through said conduits to heat the same and not admit steam thereto.

What I claim as new is—

1. The combination of an oil-reservoir having a conduit leading to the place to be lubricated, and a steam-pipe arranged to heat the reservoir, and having an extension for heating but not admitting steam to the conduit, substantially as described.

2. The combination of an oil-reservoir having a conduit leading to the place to be lubricated and a steam-pipe coiled within the reservoir, and having an extension passing through but not admitting steam to the conduit, substantially as described.

In testimony whereof I affix my signature in presence of two witnesses.

FRIDERICH JARECKI.

Witnesses:
JNO. K. HALLOCK,
C. SMALLEY.